2,811,452

Patented Oct. 29, 1957

2,811,452
WHITE SAUCE BASE

Jean N. Lesparre, Chicago, Milo B. Medlock, Jr., Western Springs, and Charles E. Morris, Chicago, Ill., assignors to Armour and Company, Chicago, Ill., a corporation of Illinois No Drawing. Application March 22, 1954, Serial No. 417,980

2 Claims. (Cl. 99—144)

This invention relates to a white sauce base.

So-called "white sauce" is frequently used in cooking, being the sauce constituent for many creamed meat and vegetable dishes. Heretofore it has been prepared as needed, the usual recipe including flour, milk, and butter or margarine as the principal ingredients. It is frequently a matter of some difficulty to combine these ingredients to form a smooth, non-lumpy white sauce, and it is also difficult to regulate the thickness of the white sauce to produce a satisfactory white sauce of a thin or thick consistency, as desired. Further, the use of high quality ingredients does not always assure satisfactory quality in the product.

It is therefore a general object of this invention to provide a white sauce base suitable for commercial manufacture and sale for use in preparing white sauce of varying consistency, which assures ease of preparation without lumping, and gives uniformly high quality sauce. Further objects and advantages will appear as the specification proceeds.

The white sauce base of this invention is characterized by its soft, pasty consistency and by containing oleo oil as one of its principal ingredients. The paste form of the product has been found to be important in achieving the advantages and new results of the invention, as has the use of oleo oil. No satisfactory substitute for oleo oil has been found, except oleo stock, which provides some of the same advantages, since it contains oleo oil. More specifically, oleo stock is rendered beef fat from which oleo oil is obtained by the separation of oleostearine.

In practicing this invention, the white sauce base should contain from 25 to 50% by weight of oleo oil or oleo stock, preferably oleo oil. Flour and dry milk solids are the other principal ingredients. The flour employed is preferably white wheat flour, and the dry milk solids are preferably fat free, e. g., powdered skimmed milk. The relative proportions of these principal ingredients can be varied so long as sufficient oleo oil or oleo stock is present to form a soft paste. Usually approximately equal parts of the three principal ingredients give good results.

The incorporation of an edible stabilizing or emulsifying agent in the white sauce base is desirable. Best results are obtained with soya lecithin, especially where a rather wide selection of consistencies in the white sauce is desired. By incorporating from .005 to .05 part of soya lecithin per part of oleo oil, sauces can be prepared from the base using 1 part of the white sauce base to from 2 to 5 parts of water. For example, a thin white sauce might be prepared using 5 parts of water to 1 part of base, or a thick sauce prepared by using 2 parts of water per part of base. It has also been found that the incorporation of soya lecithin in the white sauce base in the amounts specified gives a considerable increase in volume when the base is combined with water over that which would be obtained if the soya lecithin was not present. The volume will be increased from 10 to 15% on the average, thus giving the advantage of a greater yield of white sauce from the same quantity of white sauce base.

Oleo oil or oleo stock has not heretofore been used as a white sauce ingredient, and this is undoubtedly due to the fact that it is not the equivalent of butter or margarine in flavor characteristics. However, it has been discovered in connection with the present invention that this deficiency can be overcome by the incorporation of from .01 to .1 part of monosodium glutamate per part of oleo oil in the white sauce base. In this way, the properties of oleo oil which have been found to be desirable for the purposes of this invention can be taken advantage of while still obtaining a high quality product from the standpoint of taste and palatability.

It has also been found desirable to incorporate starch in the white sauce base as a minor ingredient. Preferably, corn starch is used for this purpose in an amount of .1 to .3 part of corn starch per part of oleo oil.

In preparing the white sauce base of this invention it is preferred to thoroughly mix all of the dry ingredients before combining them with the oleo oil. Also, it is preferred to disperse the soya lecithin in the oleo oil, and to heat the oil to a temperature above 100° F., preferably from 130 to 160° F., before combining the oleo oil and mixed dry ingredients. The heated oleo oil and mixed dry ingredients are then blended together and thoroughly mixed to form a smooth, homogeneous paste.

This invention is further illustrated by the following specific example.

Example

Thirty pounds 8 ounces of white wheat flour, 24 pounds of powdered skimmed milk, 4 pounds 13 ounces of corn starch, 4 pounds 2 ounces of salt, and 12 ounces of monosodium glutamate were mixed in a blender to form a dry mixture. Five ounces of soya lecithin was dispersed in oleo oil at a temperature of 145 to 150° F. The heated oleo oil was then added to the dry mixture and blended to form a soft, smooth paste. It required only about 3 to 4 minutes to complete the blending operation.

The white sauce base thus prepared was subjected to storage tests at 98, 80 and 40° F. for a period of 6 weeks. Inspection showed no adverse effects on the quality of the white sauce base at any of the temperatures, thereby indicating that storage under refrigeration was not necessary. The pasty consistency of the base at room temperature was also retained at refrigeration temperatures. Tests involving the use of the base for forming white sauces showed that the white sauce produced was satisfactory in all respects, including color, flavor, and smoothness.

Further tests with the white sauce base showed that it can be used to prepare white sauce of a thin, medium, or thick consistency by dispersing the base with varying amounts of water.

While in the foregoing specification this invention has been described in considerable detail and specific embodiments have been set forth, it will be apparent to those skilled in the art that the invention is susceptible to additional embodiments and that many of the details set forth herein can be varied widely without departing from the basic concepts of the invention.

We claim:

1. A white sauce base dispersible in water to form a white sauce, said base being in the physical form of a soft paste and containing as principal ingredients white wheat flour, powdered skimmed milk, and a constituent selected from the group consisting of oleo oil and oleo stock, said constituent comprising from 25 to 50% by weight of said base, and said base also containing from .01 to .1 part of monosodium glutamate per part of said constituent.

2. A white sauce base dispersible in water to form a white sauce, said base being in the physical form of a soft paste and containing as principal ingredients white wheat flour, powdered skimmed milk, and oleo oil, said oleo oil comprising from 25 to 50% by weight of said base, said base also containing from .005 to .05 part of soya lecithin and from .01 to .1 part of monosodium glutamate per part of oleo oil.

References Cited in the file of this patent

UNITED STATES PATENTS

| | | |
|---|---|---|
| 2,089,470 | Epstein et al. | Aug. 10, 1937 |
| 2,125,391 | Musher | Aug. 2, 1938 |
| 2,168,360 | Musher | Aug. 8, 1939 |

OTHER REFERENCES

"Monosodium Glutamate," Food Packer, July 1948, page 30.

"Everybody's Cookbook," by Lord, revised edition, Harcourt, Brace and Company, New York, pages 536 and 537.